Jan. 7, 1958

R. BARANY 2,818,944

DOUBLE CURVATURE BRAKE SHOE

Filed Sept. 6, 1955

Robert Barany
INVENTOR.

BY Harold J. Fox

United States Patent Office 2,818,944
Patented Jan. 7, 1958

2,818,944

DOUBLE CURVATURE BRAKE SHOE

Robert Barany, Hamilton, Ontario, Canada

Application September 6, 1955, Serial No. 532,441

3 Claims. (Cl. 188—250)

My invention relates to braking systems and more particularly to a brake shoe and lining of improved design.

The braking system in common use in automobiles and other vehicles is well known in the art. In such a system, a revolving brake drum is integrally connected with the wheel of the vehicle. Mounted in the axle housing or some other fixed structure of the vehicle is a brake shield upon which, in turn are mounted two brake shoes which are provided with flat bearing surfaces adapted to frictionally engage the inner rim of the drum when urged thereto by the action of one or more hydraulic cylinders. The bearing surface of the brake shoes is lined with a material chosen to give the maximum friction consistent with long wear, and the material in this lining accounts for a good percentage of the cost of brake relining.

As will hereinafter be pointed out in detail, large portions of conventional brake linings are not used in braking, a fact well known to mechanics and others in the art, as evidenced by the uneven wear on the linings after a period of use. This uneven wear further indicates that the maximum braking action is not obtained from a system of given lining area, for it is obvious that the friction producing the braking force for a given brake lining and a given units force of application will be directly proportional to the area of the lining which comes into contact with the drum.

When the unevenly worn brake lining is changed, moreover, despite the fact that not all of the area of the lining is worn, the whole lining is discarded, resulting in a waste of material and unnecessary expense.

It is an object of my invention, therefore, to provide a brake shoe of improved design whereby a good portion of the lining will be effective to provide braking action.

It is a further object of my invention to provide a brake shoe which, upon the lining being required to be replaced, can merely be reversed, thus providing a second lining without extra expense.

These and other advantageous objects will become apparent through a consideration of the following detailed description, taken in conjunction with the attached drawings in which.

Figure 1:
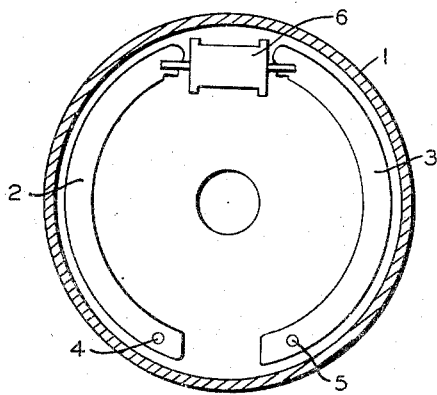
Figure 1 shows in cross section a brake drum and shoe of conventional design employing one double acting hydraulic cylinder.

In Figure 1, 1 is a brake drum integrally connected to the wheel of a vehicle and, in association therewith, two brake shoes 2 and 3. The shoes are pivoted at 4 and 5 respectively, and a double acting hydraulic cylinder 6 is adapted to force both shoes outwardly on their respective pivots 4 and 5 and into frictional engagement with the inner rim of the brake drum 1.

Since conventional brake shoes are constructed so that the bearing surface, upon which the lining if faced, is a circular arc, it will be readily apparent from a consideration of Figure 1, that the wear on the lining will be uneven, since because the shoe is pivoted and actuated as illustrated, the whole of the circular arc cannot come into contact with the rim of the braking drum. It will be appreciated that, upon actuation by cylinder 6, the shoe 2 will move towards the drum about pivot 4. The portion of the shoe shown as A, being the portion of the shoe past the pivot and remote from the cylinder, will, in fact, withdraw from the drum, while the remainder of the shoe lining will make initial contact at a point only rather than as a surface. This is so because both drum and lining have the same radius of curvature and because the lining moves onto the drum about a pivot rather than as a whole.

Figure 2:
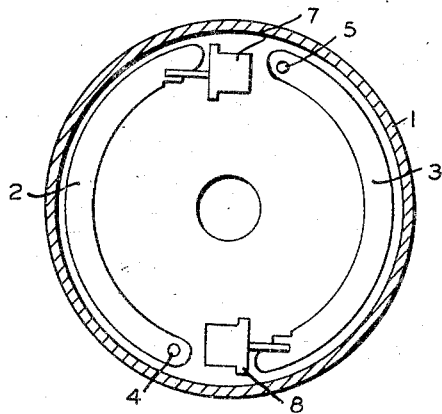
Figure 2 shows in cross section a brake drum and shoe of conventional design employing two single acting hydraulic cylinders.

The same effect can be observed by reference to Figure 2, which illustrates a braking system actuated by two single acting hydraulic cylinders 7 and 8, each adapted to actuate one shoe.

The difficulties above pointed out have been recognized in the trade and efforts to overcome them have been made. The heel of the shoe has in the past been set a few thousandths of an inch closer to the drum than the toe, but this practice has generally been found unsatisfactory and of temporary benefit only.

In general, it has been found that only a portion of the surface of a brake lining becomes worn, indicating that the conventional brake linings above described operate at only a percentage of optimum efficiency.

Figure 3:
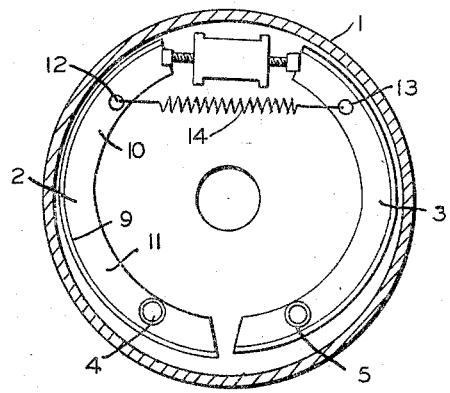
Figure 3 shows in cross section my improved form of brake drum and shoe as applied to the installation of Figure 1.
Figure 4:
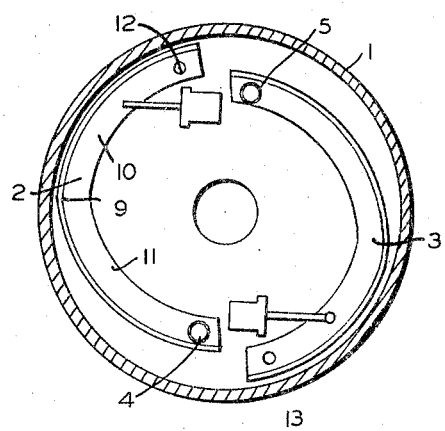
Figure 4 shows in cross section my improved form of brake drum and shoe as applied to the installation of Figure 2.

In contrast to the conventional system, is my improved form of brake shoe, two examples of which are shown in Figures 3 and 4.

My invention consists broadly of a brake shoe formed so as to have two equal bearing surfaces, only one of which being adapted to frictionally engage the brake drum at a time, each surface having the same radius of curvature, but a different centre of curvature, whereby when a brake lining becomes worn, the shoe may be removed, reversed and replaced, saving the expense of a new lining.

As is shown in Figure 3, two brake shoes 2 and 3 constructed according to my invention and, as in all previous applications, are identical. Referring particularly to shoe 2 shown in Figure 3, it will be seen that the brake shoe has two equal portions 10 and 11 which, while of the same radius of curvature, (i. e., that of the drum surface against which the shoe engages), have different centres of curvature. Thus when in installed position, only one such portion of each brake shoe will engage the drum and provide braking action. In Figure 3, shoe 2 is pivoted at 4, and section 10, the section remote from the pivot 4, is urged, by means of piston 6, against the drum to provide the required braking force. Similarly, only the section of shoe 3 remote from the pivot 5 is urged against the drum to provide the required braking force.

It will readily be apparent that by pivoting the shoe at one end, it will be possible to swing the shoe about such pivot in such a manner that the section adapted to contact the drum (for example, section 10 of shoe 2 in Figure 3) will swing into contact with the drum as a surface, rather than merely as a line or a restricted section of the brake lining as was heretofore the case. This results in a more uniform braking action in my construction than has been the case in prior practice for the braking force in my construction then becomes proportional to the force applied by piston 6.

Since only one section of the two sections of the brake lining of each shoe constructed according to my invention comes in contact with the drum, it follows that only that one section becomes worn. If this section becomes worn to the extent that it is no longer efficacious, instead of requiring the purchase of a new lining, the shoe constructed according to my invention need only be reversed, and the unworn section used to provide the necessary friction. This results in a considerable saving in each relining job, and forms one of the principal objects of my invention.

To reverse the brake shoe, and to cause segment 11 to bear against the drum instead of segment 10 as shown in Figure 3, it is merely necessary to place the anchor holes 12 and 13 about the fixed anchor pins 4 and 5, without any other change to the braking system.

It will be appreciated that in this application of my invention, the holes 12 and 13 may be used to affix the retracting spring 14 as is shown in Figure 3, thus obviating the necessity for drilling other holes in the brake shoe for this purpose.

Figure 4 shows how this same principle may be adapted to an installation including two single acting pistons as described in Figure 2.

The amount by which the centre of the radii of curvature of the two sections of a brake shoe constructed according to my invention is shifted, is not critical. As long as there is sufficient difference to ensure that no portion of the section not being used for braking comes into contact with the drum, the improved design which forms my invention may be used. I have found in practice that a 5° shift in centre is sufficient.

It will be appreciated that the brake shoe must be truly reversible, that is that the two sections of the shoe be equal in length.

It will be readily apparent to those skilled in the art that this invention may be readily adapted to existing installations since it requires only the re-location of the anchor pin and the provision of improved brake shoes as above described. Because no new brake drum is required and because the system is so readily adaptable to the conventional application now in current use, the improved form of my invention is particularly apt.

I have described above two embodiments of my invention. It will be appareunt to those skilled in the art, however, that the principle of my invention may easily be applied to any other type of braking system in which the drum and shoe type of frictional contact is used. For this reason, the embodiments described are to be considered as exemplary only, and such embodiments of my invention as fall within the scope and purview of the appended claims are to be considered as part of my invention.

What I claim as my invention is:

1. In a braking system of the class described, a symmetrical, one-piece, rigid brake shoe having two longitudinally curved friction surfaces, each friction surface having the same radius of curvature but a different center of curvature, only one of said surfaces being adapted to frictionally engage a brake drum at the same time.

2. In a reversible brake shoe as claimed in claim 1 wherein said two bearing surfaces are of equal area.

3. In a reversible brake shoe as claimed in claim 2 wherein the center of curvature of the said two bearing surfaces are approximately 5° apart.

References Cited in the file of this patent

UNITED STATES PATENTS

| 1,724,114 | Stoner | Aug. 13, 1929 |
| 2,083,989 | Eisenhardt | June 15, 1937 |

FOREIGN PATENTS

| 615,924 | Great Britain | Jan. 13, 1949 |